United States Patent [19]

Ito

[11] 4,061,998
[45] Dec. 6, 1977

[54] CHARACTER RECOGNITION EQUIPMENT

[75] Inventor: Chiaki Ito, Yokohama, Japan

[73] Assignee: Fujitsu Limited, Kawasaki, Japan

[21] Appl. No.: 707,115

[22] Filed: July 20, 1976

[30] Foreign Application Priority Data

July 26, 1975 Japan .................................. 50-91789

[51] Int. Cl.² .............................................. G06K 9/12
[52] U.S. Cl. .................. 340/146.3 AC; 340/146.3 H;
340/146.3 J
[58] Field of Search .......... 340/146.3 AC, 146.3 MA,
340/146.3 R, 146.3 J, 146.3 H

[56] References Cited

U.S. PATENT DOCUMENTS

| | | | |
|---|---|---|---|
| 3,541,511 | 11/1970 | Genchi et al. | 340/146.3 AC |
| 3,585,592 | 6/1971 | Kiji et al. | 340/146.3 AC |
| 3,873,972 | 3/1975 | Levine | 340/146.3 AC |
| 3,975,709 | 8/1976 | Beun et al. | 340/146.3 MA |

*Primary Examiner*—Leo H. Boudreau
*Attorney, Agent, or Firm*—Staas & Halsey

[57] ABSTRACT

Herein disclosed is a character recognition system which comprises a video input device which obtains character video signals by raster scanning characters which exist on a medium; a quantization unit which converts said character video signals into binary code video signals; and a character centerline shaping device which transforms said binary code video signals into character centerline figures which are formed by the character centerlines of said binary code video signals. According to the characteristic feature of the present invention, a temporary memory device temporarily stores said character centerline figures; a feature extract device divides said character centerline figures in said temporary memory device into divided regions with lines which have the original scanning direction or which are at right angles with respect to said original scanning direction, takes out every column of partial centerline figures in said divided regions, said column being at a right angle with respect to said lines, and extracts positions of start points of said partial centerline figures in every divided region, positions of end points of said partial centerline figures in said every divided region, and displacements of said partial centerline figures from said start points to said end points; and a sequential logic circuit decides the categories of the character based on the order of the outputs of said feature extract device.

5 Claims, 12 Drawing Figures

CHARACTER RECOGNITION EQUIPMENT

Reference is hereby made to co-pending U.S. Application Ser. No. 631,149, filed on Nov. 11, 1975, by the same inventor as this herein disclosed invention.

BACKGROUND OF THE INVENTION

1. Field of the Invention

The present invention relates to a character recognition system which forms character centerline figures from character video signals, extracts the features of the divided character centerline figures, and recognizes the categories of the character.

2. Description of the Prior Art

In conventional character recognition equipment, the characters recorded on a medium are optically raster scanned so that the characters are transformed into character video signals; the character video signals are quantized so as to be transformed into digital coded video signals. Based on the digital coded video signals, character centerline figures are formed and analyzed so as to extract the features of said figures. The extracted features of said figures are recognized with reference to a dictionary which has already been previously prepared.

In said conventional equipment, when characters are written by hand, the features of the handwriting of each person are also extracted; therefore, the process of extracting the characters features become very complex.

SUMMARY OF THE INVENTION

An object of the present invention is to provide a character recognition system which analyzes the character centerline figure obtained from character video signals, extracts the features of the character centerline figure and can recognize the character simply and reliably.

For the purpose of obtaining the above-mentioned object, the character recognition system of the present invention comprises a video input device which obtains character video signals by raster scanning characters existing on a medium; a quantization unit converts the character video signals into binary code video signals; and a character centerline shaping device transforms the binary code video signals into character centerline figures formed by the character centerlines of said binary code video signals. According to the characteristic feature of the present invention a memory device temporarily stores the character centerline figures; a feature extract device divides the said character centerline figures into regions with lines which have the scanning direction or which are at right angles with respect to said scanning direction, takes out every column of partial centerline figures in said divided regions, said column being of a right angle with respect to said lines, and said feature extract device extracts positions of start points of said partial centerline figures in every divided region, positions of end points of said partial centerline figures in said every divided region, and displacements of said partial centerline figures from said starting points to said end points, and a sequential logic circuit decides the categories of the character based on the order of the outputs of said feature extract device.

Further features and advantages of the present invention will be apparent from the ensuing description with reference to the accompanying drawings to which, however, the scope of the invention is in no way limited.

DETAILED DESCRIPTION OF THE PREFERRED EMBODIMENT

Figure 1:
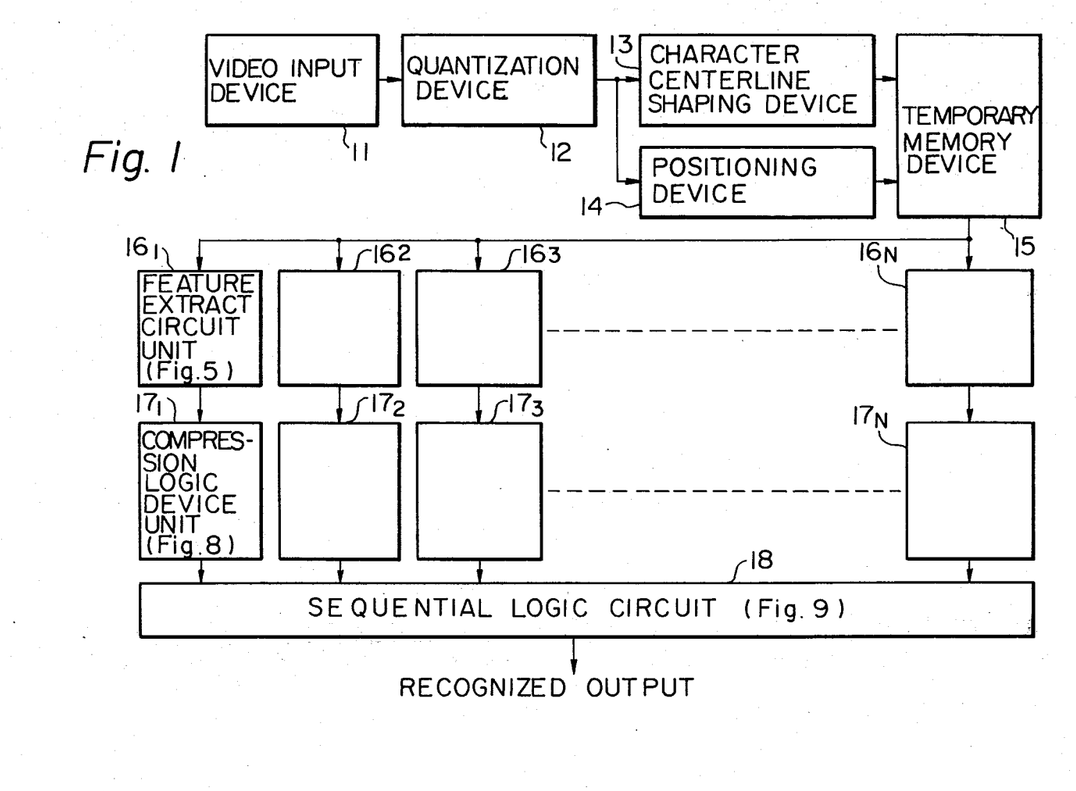
FIG. 1 is a block diagram of one embodiment of the character recognition system according to the present invention.

Referring to FIG. 1, a video input device 11 line scans characters written on a medium such as paper, for example, and transforms these characters into character video signals. These character video signals are supplied to a quantization device 12 which converts said signals to binary coded video signals. The output of the quantization device 12 is supplied to a character centerline shaping device 13 so as to form the characters which are formed with character centerlines. The output of the quantization device 12 is also supplied to a positioning device 14 so as to divide the characters stored in the temporary scratch pad type memory device 15. The output of the character centerline shaping device 13 is temporarily stored in the temporary memory device 15.

The divided characters in the temporary memory device 15 are read out to feature extract circuit units $16_1$ through 16N. The number N of the feature extract units corresponds to the number of divisions of the character, and the read out from the temporary memory device 15 is supplied in parallel to said units $16_1$ through 16N. Each output of the units $16_1$ through 16N is respectively supplied to corresponding compression logic device units $17_1$ through 17N, which produces the output of a sequence of features of the character having quasi-continuities acceptable to the features of the outputs of the units $16_1$ through 16N. The outputs of these compression logic device units $17_1$ through 17N are supplied to a sequential logic circuit 18. The unit 18 determines the category of the character based on the outputs of the units $17_1$ through 17N.

Next, we will explain the detailed function of the character recognition system shown in FIG. 1.

Figure 2:
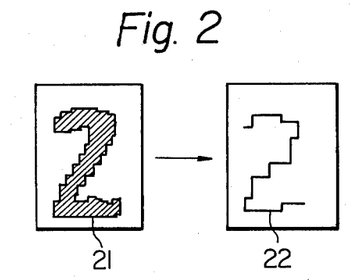
FIG. 2 illustrates a figure which is temporarily stored in temporary memory device shown in FIG. 1.
Figure 3:
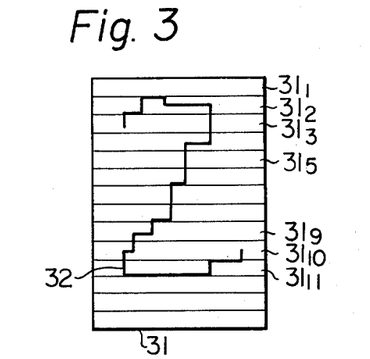
FIG. 3 illustrates a character centerline figure which is divided by horizontal lines.

In the character centerline shaping device 13, the output of the quantization device, for example, a figure 21 of FIG. 2 is transformed into a centerline shape as in figure 22 of FIG. 2. In FIG. 2, the figure 22 is composed of one-bit centerlines. The centerline shape figure 22 is horizontally divided into N regions. For example, as shown in FIG. 3, the centerline shape figure 32 is divided by three-bit widths to divided regions $31_1$ through $31N$. Partial centerline shapes in the divided regions $31_1$ through $31N$ are supplied at the same time to the feature extract circuit units $16_1$ through $16N$, respectively.

Figure 4:
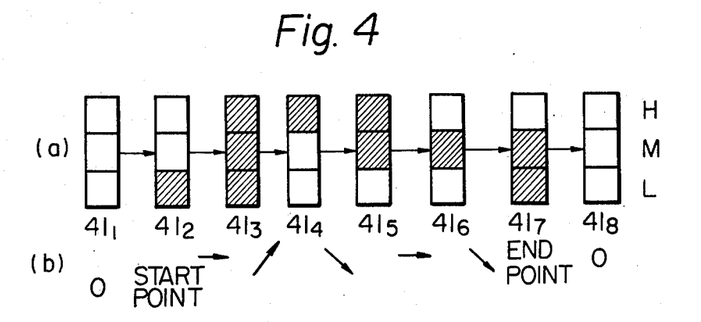
FIG. 4 illustrates one divided region of the character centerline figure.

One divided region, for example, region $31_2$ is composed as shown in (a) of FIG. 4. Patterns $41_1$ through $41_8$, as shown in (a) of FIG. 4, are read from the temporary memory device 15 so as to be supplied to the feature extract circuit unit $16_2$. As the repetition of the same pattern is meaningless, the repeated pattern is disregarded in (a) of FIG. 4. The divided region $31_2$ shown in (a) of FIG. 4 can be indicated with the displacement (b) of FIG. 4 via the feature extract circuit unit.

Figure 5:
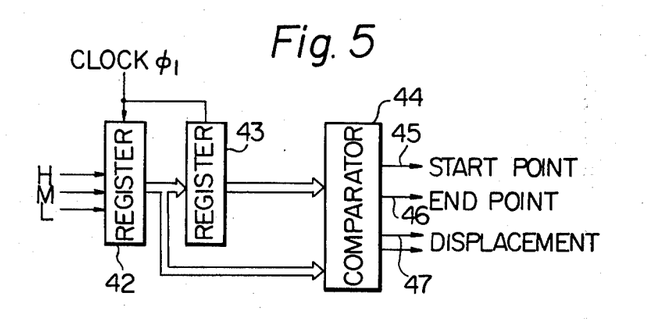
FIG. 5 is a block diagram representing each feature extract circuit unit shown in FIG. 1.

FIG. 5 is a circuit of one of the feature extract circuit units $16_1$ through 16N. In FIG. 5, two registers 42 and 43 are connected in a cascade arrangement and are set by clock $\phi_1$. The comparator 44 compares the outputs of the two registers 42 and 43; that is; one input pattern is compared with the prior pattern. When three parts H, M and L of the three-bits pattern are all binary "0" in the register 43 and at least one output of the three parts H, M and L appears as a binary "1" at the register 42, the data in the register 42 are deemed as a starting point and an output signal appears at a terminal 45 of the comparator 44. When three parts H, M and L of the three-bits pattern are all binary "0" in the register 42 and at least one output of the three parts H, M and L appears as a binary "1" at the register 43, the data in the register 43 is deemed as an end point and an output signal appears at a terminal 46 of the comparator 44. Data concerning the displacement from one pattern to the next pattern at the displacement terminals 47 of the comparator 44. Corresponding to 54 combinations of the registers 42 and 43, the outputs at the terminals 47 can be represented by four kinds of outputs:

an upward inclining ( ↑ ), a downward inclining ( ↓ ), a horizontal (→) and a "O" output as shown in (b) of FIG. 4.

Figure 6A:
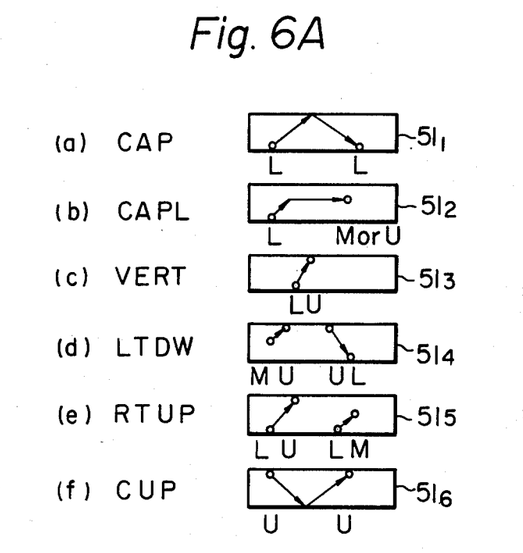
FIGS. 6A and 6B show basic patterns of a character which are obtained from the feature extract circuit unit of FIG. 5.
Figure 6B:
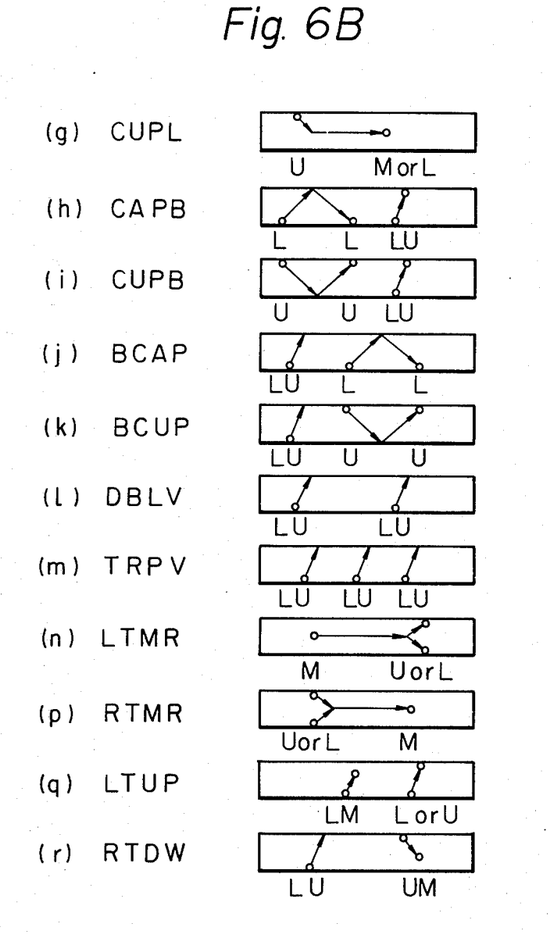

By combining the start point output 45 with the end point output 46 and the above-mentioned four outputs 47, the character 32, shown in FIG. 3, can be represented by basic patterns (a) through (f) as shown in FIG. 6A. The basic pattern (a) CAP $51_1$ of FIG. 6A, corresponds to the divided region $31_2$. The basic pattern (b) CAPL $51_2$ of FIG. 6A corresponds to the centerline shape in the divided region $31_3$; the basic pattern (c) VERT $51_3$ corresponds to the centerline shape in the divided region $31_6$; the basic pattern (d) LTDW $51_4$ corresponds to the centerline shape in the divided region; the basic pattern (e) RTUP $51_5$ corresponds to the centerline shape in the divided region $31_{10}$; and the basic pattern (f) CUP $51_6$ corresponds to the centerline shape in the divided region $31_{11}$. FIG. 6B shows the other basic patterns (g) through (r), which are not used in the character 32 shown in FIG. 3.

Figure 7:
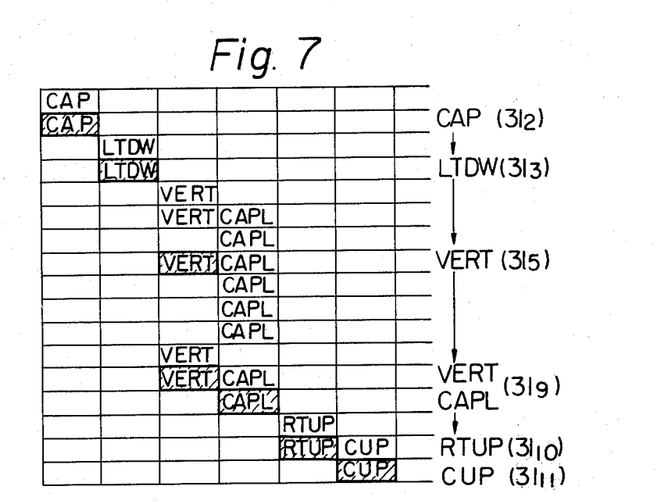
FIG. 7 is a diagram showing the relation between the feature patterns shown in FIG. 6A and the divided regions shown in FIG. 3.

Actually, in FIG. 3, the divided regions $31_2$, $31_3$, ..., $31_n$ overlap in the adjoining regions. FIG. 7 shows an aspect of the overlapping divided regions of the character centerline figure 32 shown in FIG. 3. In FIG. 7, the aforementioned six feature output patterns CAP, LTDW, VERT, CAPL, RTUP, and CUP are arranged horizontally, and the divided regions $31_2$ through $31_{11}$ are arranged vertically. In FIG. 7, redundancies due to the overlappings or the repetitions of the same condition are eliminated, and the features which are enclosed by hatched rectangles are supplied as the outputs to the compression logic device units $17_1$ through 17N and further to the sequential logic circuit 18.

Figure 8A:
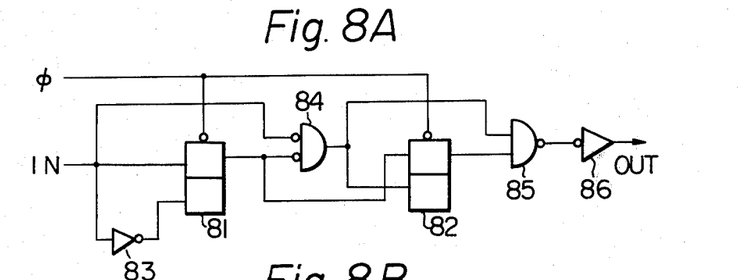
FIG. 8A is a block diagram of the compression logic device unit.
Figure 8B:
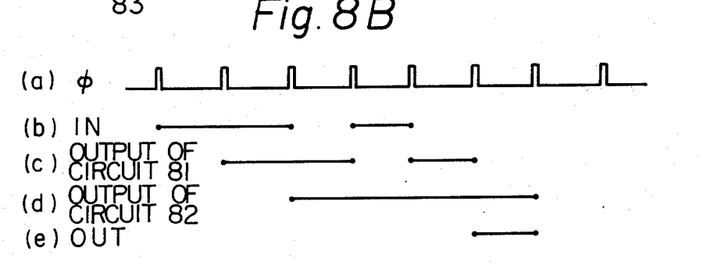
FIG. 8B illustrates the waveforms appearing at indicated points of the compression logic device unit.

FIG. 8A shows the block diagram of a compression logic device unit. Referring to FIG. 8A, flip flop circuits 81 and 82 are set by the clock $\phi$. An input signal is supplied to a set terminal of the circuit 81 and also supplied via a NOT circuit 83 to a reset terminal of the circuit 81, and further supplied to one input terminal of the NOR circuit 84. The set output of the circuit 81 is supplied to another input of the NOR circuit 84 and to a set terminal of the circuit 82. The output of the circuit 84 is supplied to one input of the NAND circuit 85 and also supplied to a reset terminal of the circuit 82. The set output of the circuit 82 is applied to a terminal of the NAND circuit 85, and the output of the circuit 85 is an output signal via a NOT circuit 86. The waveforms appearing at the essential parts of the circuit of FIG. 8A are shown in FIG. 8B. As can be seen from FIG. 8B, in the circuit of 8A, one discontinuity is allowable, and the final part of the combination is used as the respective output signal.

Figures 9A, 9B:
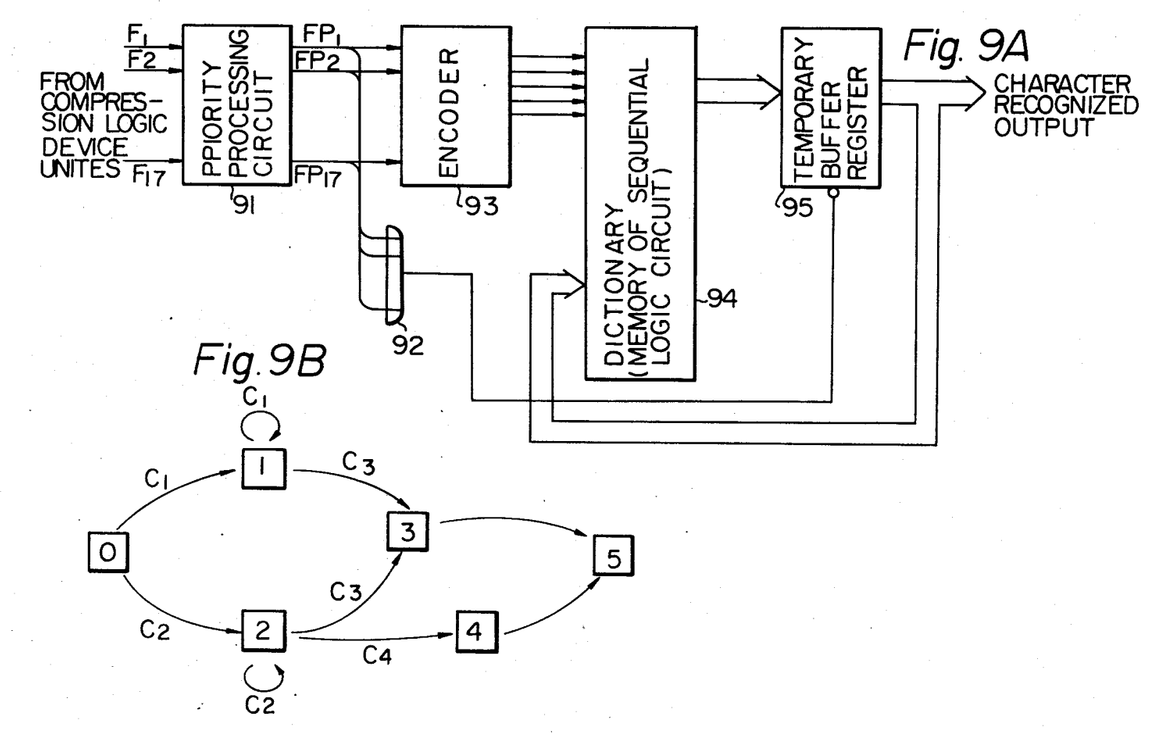
FIG. 9A is a block diagram of the sequential logic circuit.
FIG. 9B is a flow diagram of the sequential logic circuit (dictionary) shown in FIG. 9A.

The outputs of the compression logic device units $17_1$ through 17N are supplied to the sequential logic circuit 18 shown in detail in FIGS. 9A and 9B. The outputs of the compression logic device units $17_1$ through 17N are supplied to a priority processing circuit 91. When more than two features are supplied from the same region, said circuit 91 selects the feature which is to be preferentially selected. Therefore, only one output is obtained at each output terminal $FP_1$ through $FP_N$. The outputs $FP_1$ through $FP_{17}$ are supplied to an OR circuit 92. The outputs $FP_1$ through $FP_{17}$ are also supplied to an encoder 93 where seventeen features are encoded to a five-bit code. The five-bit output of the encoder 93 is supplied to a dictionary, that is, a memory 94. In the memory 94, the five-bit output of the encoder 93 is used as a LOW ADDRESS and the corresponding readout of the memory 94 is fed back via a temporary buffer register 95 for use as a HIGH ADDRESS. The temporary buffer register 95 is set by the clock pulse which is generated at the output of the OR circuit 92, and the output of the register 95 is fed back to the memory 94. The character to be read is judged in accordance with the position of the final feature of the register 95 in the dictionary 94. FIG. 9B shows the relation between the LOW ADDRESS 1, 2, 3, 4 and 5 and the HIGH ADDRESS $C_1$, $C_2$, $C_3$, $C_4$, ..., $C_n$. In FIG. 9B, $C_1$ though $C_n$ are the conditions where the position is to be jumped and this jumping condition is obtained from the output of the temporary buffer register 95.

As shown above, according to the present invention, a binary code video signal of the character is converted to a character centerline figure, said character centerline figure is divided by the parallel lines, and, with respect to the divided centerline figure in each divided region, the feature extract circuit extracts the start points, the end points, and the aspect of the displacement from the start point to the end point. These extracted features are composed of six basic patterns. Actually, as mentioned above, each of the regions is overlapped with each other, the compression logic device unit eliminates the redundancies which are caused by the overlaps of the divided region or the repetitions of the same condition, and the sequence of the feature having quasi-continuities is supplied to the sequential logic circuit so as to recognize the character.

Therefore, according to the present invention, the features of the character can be composed of a small number of the basic patterns, and the sequence of the features can be compressed to a minimum indispensable number, so that the construction and the action of the apparatus can be simplified without forfeiting the reliability of the recognition process of the characters.

What is claimed is:

1. A character recognition system comprising:
   a video input device which obtains character video signals by raster scanning characters which exist on a medium;
   a quantization unit which converts said character video signals into binary code video signals;
   a character centerline shaping device which transforms said binary code video signals into character centerline figures;
   a temporary memory device which temporarily stores said character centerline figures;
   a feature extract device which divides said character centerline figures in said temporary memory device into divided regions with lines, said lines being in the scanning direction or being at right angles wiith respect to said scanning direction, said divided regions being composed of columns having $n$ bits which device takes out every column of partial centerline figures in said divided regions, said solumn being at a right angle with respect to said lines, and which device extracts the positions of a start point of said partial centerline figures in every divided region, positions of end points of said partial centerline figures in said every divided region, and displacements of said partial centerline figures from said start points to said end points, and;
   a sequential logic circuit which decides the categories of the character based on a sequence of the outputs of said feature extract device.

2. A character recognition equipment according to claim 1, wherein said divided regions are formed with overlaps between adjacent regions and said character recognition equipment further comprises, between said extract device and said sequential logic circuit, a compression logic unit which transforms the feature outputs of said divided regions of said feature extract device into a sequence of the features having quasi-continuities which are discontinuities acceptable to the features of said partial centerline figures.

3. A character recognition equipment according to claim 2, wherein said each feature extract circuit unit comprises a first register which receives the information of said column, a second register which is connected in a cascade arrangement to said first register, and a comparator which compares the outputs of said first register and of said second register and produces outputs of information of the position of said start point, of said end point, and of the displacements from said start point to said end point.

4. A character recognition equipment according to claim 2, said compression logic device unit comprising a first flip-flop which receives said feature outputs of said divided regions, an NOR circuit which receives said feature outputs and the set output of said first flip-flop, a second flip-flop which receives the output of said NOR circuit and the set output of said first flip-flop, an NAND circuit which receives the set output of said second flip-flop, and the output of said NAND circuit and a NOT circuit which is connected to said NAND circuit.

5. A character recognition equipment according to claim 2, wherein said sequential logic circuit comprises a priority processing circuit which selects the features to be preferentially selected when more than two features are supplied from the same region, an encoder which converts the outputs of said priority processing circuit to five bits code, a dictionary which receives the outputs of said encoder as the LOW ADDRESS, and a temporary buffer register which feeds back the outputs of said dictionary to said dictionary as the HIGH ADDRESS so as to recognize the character in accordance with the final feature position in the dictionary.

* * * * *

UNITED STATES PATENT OFFICE
CERTIFICATE OF CORRECTION

Patent No. 4,061,998      Dated December 6, 1977

Inventor(s) Chiaki Ito

It is certified that error appears in the above-identified patent and that said Letters Patent are hereby corrected as shown below:

```
Column 1, line 52, "said" should be -- stored --;
Column 2, line 44, "scratch pad type" should be
         -- (scratch pad type) --;
Column 3, line 38, after "pattern", insert -- appear --;
Column 4, line 52, "though" should be -- through --;
Column 5, line 26, "wiith" should be -- with --;
* Column 5, line 29, "so-" should be -- co-  --;
Column 6, line 3, delete "feature".
```

Signed and Sealed this

Fourth Day of April 1978

[SEAL]

Attest:

RUTH C. MASON
Attesting Officer

LUTRELLE F. PARKER
Acting Commissioner of Patents and Trademarks